(12) United States Patent
Park

(10) Patent No.: US 10,152,179 B2
(45) Date of Patent: Dec. 11, 2018

(54) TOUCH SENSING APPARATUS AND METHOD

(71) Applicant: LG DISPLAY CO., LTD., Seoul (KR)

(72) Inventor: Dong-Jo Park, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/086,872

(22) Filed: Nov. 21, 2013

(65) Prior Publication Data

US 2014/0176489 A1 Jun. 26, 2014

(30) Foreign Application Priority Data

Dec. 26, 2012 (KR) ........................ 10-2012-0152903

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01)

(58) Field of Classification Search
None
See application file for complete search history.

(56) References Cited

U.S. PATENT DOCUMENTS

| | | | | |
|---|---|---|---|---|
| 8,928,622 B2* | 1/2015 | Wang et al. | ................... | 345/174 |
| 9,329,723 B2* | 5/2016 | Benbasat | .............. | G06F 3/0418 |
| 2006/0146038 A1 | 7/2006 | Park et al. | | |
| 2006/0267953 A1* | 11/2006 | Peterson, Jr. | ......... | G06F 3/0418 |
| | | | | 345/173 |
| 2007/0257890 A1* | 11/2007 | Hotelling et al. | ............ | 345/173 |
| 2009/0303358 A1* | 12/2009 | Kawahito | ........... | H03M 1/1245 |
| | | | | 348/255 |
| 2009/0315851 A1* | 12/2009 | Hotelling | .............. | G06F 3/0418 |
| | | | | 345/173 |
| 2010/0079401 A1 | 4/2010 | Staton | | |
| 2011/0068810 A1 | 3/2011 | Yeates et al. | | |
| 2011/0102353 A1 | 5/2011 | Kim et al. | | |

(Continued)

FOREIGN PATENT DOCUMENTS

| | | |
|---|---|---|
| CN | 1797306 A | 7/2006 |
| CN | 101719045 A | 6/2010 |

(Continued)

*Primary Examiner* — Jennifer Mehmood
*Assistant Examiner* — Parul H Gupta
(74) *Attorney, Agent, or Firm* — Birch, Stewart, Kolasch & Birch, LLP

(57) ABSTRACT

A touch sensing apparatus and method for correctly sensing a touch signal by removing an offset per touch node via differential sensing are discussed. The touch sensing method includes sensing a first sensing value including an offset component per touch node using a read out signal of a touch sensor, the touch sensor not being supplied with a driving pulse, in a first sensing period; sensing a second sensing value including the offset component of the touch node and a mutual capacitive component based on whether a touch is performed, using a read out signal of the touch sensor, the touch sensor being supplied with a driving pulse, in a second sensing period; and acquiring touch data from which the offset component is removed via a differential operation of the second sensing value and the first sensing value.

14 Claims, 9 Drawing Sheets

(56) References Cited

U.S. PATENT DOCUMENTS

| | | | | |
|---|---|---|---|---|
| 2012/0062497 A1* | 3/2012 | Rebeschi | ............ | G06F 3/03545 |
| | | | | 345/174 |
| 2012/0194469 A1* | 8/2012 | Wang | ................ | G06F 3/044 |
| | | | | 345/174 |
| 2012/0217978 A1* | 8/2012 | Shen | ................ | G06F 3/0418 |
| | | | | 324/601 |
| 2012/0218222 A1* | 8/2012 | Shen | ................ | G06F 3/0418 |
| | | | | 345/174 |
| 2012/0249433 A1 | 10/2012 | Deng et al. | | |
| 2012/0280932 A1* | 11/2012 | Krah | ............ | G06F 3/03545 |
| | | | | 345/173 |
| 2013/0135249 A1* | 5/2013 | Chen | ................ | G06F 3/044 |
| | | | | 345/174 |
| 2013/0169584 A1* | 7/2013 | Konradi | ............ | G06F 3/044 |
| | | | | 345/174 |
| 2013/0342478 A1* | 12/2013 | Bae et al. | ................ | 345/173 |
| 2014/0132562 A1* | 5/2014 | Miyamoto et al. | ............ | 345/174 |

FOREIGN PATENT DOCUMENTS

| | | | |
|---|---|---|---|
| CN | 101893972 A | 11/2010 | |
| CN | 102047205 A | 5/2011 | |
| CN | 102156594 A | 8/2011 | |
| CN | 102239461 A | 11/2011 | |
| CN | 102707821 A | 10/2012 | |

\* cited by examiner

TOUCH SENSING APPARATUS AND METHOD

This application claims the benefit of Korean Patent Application No. 10-2012-0152903, filed on Dec. 26, 2012, which is hereby incorporated by reference as if fully set forth herein.

BACKGROUND OF THE INVENTION

Field of the Invention

The present invention relates to a touch sensing apparatus and method for correctly sensing a touch signal by removing an offset per touch node via differential sensing.

Discussion of the Related Art

Today, a touch sensor that can input information through a touch on a screen of various display apparatuses has been widely used as an information input device of a computer system. The touch sensor allows a user to move or select displayed information by simply touching the screen with a finger or a stylus, and thus, can be easily used by men and women of all ages.

A touch sensor detects a touch and touch location generated on a display apparatus and outputs touch information. A computer system analyzes the touch information and executes a command. As the display apparatus, a flat display apparatus such as a liquid crystal display (LCD), a plasma display panel (PDP), an organic light emitting diode (OLED) display, or the like is mainly used. A touch sensor technology is classified into a resistive method, a capacitive method, an optical method, an infrared method, an ultrasonic method, an electromagnetic method, etc. according to a sensing principle.

A touch sensor is configured as an on-cell touch sensor that is prepared in a panel form and is attached on a display apparatus or an in-cell touch sensor that is internally installed in a pixel matrix of a display apparatus. As the touch sensor, a photo touch sensor that recognizes a touch according to change in light intensity using a photo transistor and a capacitive touch sensor that recognizes a touch according to capacitive change are mainly used.

In general, a touch controller applies a driving pulse to a sensing electrode of a touch sensor to drive the touch sensor, senses a touch location using a readout signal of the touch sensor, indicating capacitance change according to the presence of a touch, calculates a touch point coordinate, and transmits the touch point coordinate to a host computer.

However, a conventional touch controller has some problems in that it cannot correctly sense a touch signal since a signal to noise ratio (SNR) is low due to a noise component introduced into a readout signal through a touch sensor.

Data of a no-touch state of the touch sensor or a touchscreen has non-uniformity whereby the data varies according to a touch node, which is causes by manufacturing processes of the touchscreen and various non-uniformity such as non-uniformity of routing from a touch point to a sensor circuit.

In a conventional touch sensing technology, in order to avoid the data non-uniformity in the no-touch state, touch data of one frame of the touch screen is pre-sensed in the no-touch state and is stored in a memory as reference data. In addition, when touch sensing is performed in reality, a difference value obtained by comparing a sensed touch signal with the reference data stored in the memory is used as touch sensing data, as shown in FIG. 1.

However, the conventional touch sensing technology is vulnerable to noise. As shown in FIG. 1, in the conventional touch sensing technology, when artificial noise is introduced into the reference data in the no-touch state, a noise component is introduced into the touch sensing data corresponding to the difference value between the sensed touch signal and the reference data, resulting in touch sensing error.

In addition, in the conventional touch sensing technology, when an environment at a time that the reference data of the no-touch state is acquired and an environment at a time that an actual touch is performed become different from each other, for example, when although there is no noise during acquisition of the reference data, noise is generated during acquisition of touch sensing data in reality, touch sensing error occurs.

SUMMARY OF THE INVENTION

Accordingly, the present invention is directed to a touch sensing apparatus and method that substantially obviates one or more problems due to limitations and disadvantages of the related art.

An object of the present invention is to provide a touch sensing apparatus and method for correctly sensing a touch signal by removing an offset per touch node via differential sensing.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a touch sensing method includes sensing a first sensing value including an offset component per touch node using a read out signal of a touch sensor, the touch sensor not being supplied with a driving pulse, in a first sensing period, sensing a second sensing value including the offset component of the touch node and a mutual capacitive component based on whether a touch is performed, using a read out signal of the touch sensor, the touch sensor being supplied with a driving pulse, in a second sensing period, and acquiring touch data from which the offset component is removed via a differential operation of the second sensing value and a first sensing value.

The sensing in the first and second sensing periods of the touch node may be performed consecutively.

The touch sensing method may further includes integrating a first read out signal to output a first analog sensing signal, holding and sampling the first analog sensing signal to output the sampled and held first analog sensing signal, converting the first analog sensing signal into first digital sensing data to output the first digital sensing data, and inputting the first digital sensing data and storing the first digital sensing data in a buffer, in the first sensing period; and integrating a second read out signal to output a second analog sensing signal, holding and sampling the second analog sensing signal to output the sampled and held second analog sensing signal, converting the second analog sensing signal into second digital sensing data to output the second digital sensing data, and performing subtraction on the second digital sensing data and the first digital sensing data from the buffer to acquire the touch data, in the second sensing period.

In another aspect of the present invention, a touch sensing apparatus includes a touch sensor for outputting a read out signal indicating capacitance change based on a presence of touch, and a touch controller for sensing a first sensing value including an offset component per touch node using a read out signal of a touch sensor, the touch sensor not being supplied with a driving pulse in a first sensing period, sensing a second sensing value including the offset component of the touch node and a mutual capacitive component based on whether a touch is performed, using a read out signal of the touch sensor, the touch sensor being supplied with a driving pulse, in a second sensing period, and acquiring touch data from which the offset component is removed via a differential operation of the second sensing value and the first sensing value.

The touch controller may include a control signal generator for generating and outputting a plurality of control signals; a driving pulse generator for generating and outputting a driving pulse; a touch sensor driver for not supplying the driving pulse from the driving pulse generator to a corresponding scan line of the touch sensor in the first sensing period and supplying the driving pulse to the corresponding scan line in the second sensing period in response to a control signal from the control signal generator; a read out circuit for sensing the first sensing value using a first read out signal from a corresponding read out line of the touch sensor in the first sensing period and sensing the second sensing value using a second read out signal from the corresponding read out line in the second sensing period in response to the control signal from the control signal generator, and then, acquiring and outputting the touch data via a differential operation of the first and second sensing values.

The read out circuit may include an analog sensing unit for integrating the first read out signal to output a first analog sensing signal in the first sensing period, and integrating the second read out signal to output a second analog sensing signal in the second sensing period, a sample and hold unit for holding and sampling the first analog sensing signal to output the sampled and held first analog sensing signal in the first sensing period, and holding and sampling the second analog sensing signal to output the sampled and held second analog sensing signal in the second sensing period, a digital-to-analog converter for converting the first analog sensing signal from the sample and hold unit into first digital sensing data to output the first digital sensing data in the first sensing period, and converting the second analog sensing signal from the sample and hold unit into second digital sensing data to output the second digital sensing data in the second sensing period, and a differential operator for inputting the first digital sensing data and storing the first digital sensing data in a buffer in the first sensing period, and performing subtraction on the second digital sensing data and the first digital sensing data from the buffer in the second sensing period to acquire the touch data.

The touch sensor may have scan lines being allocated with a period including consecutive first and second sensing periods.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
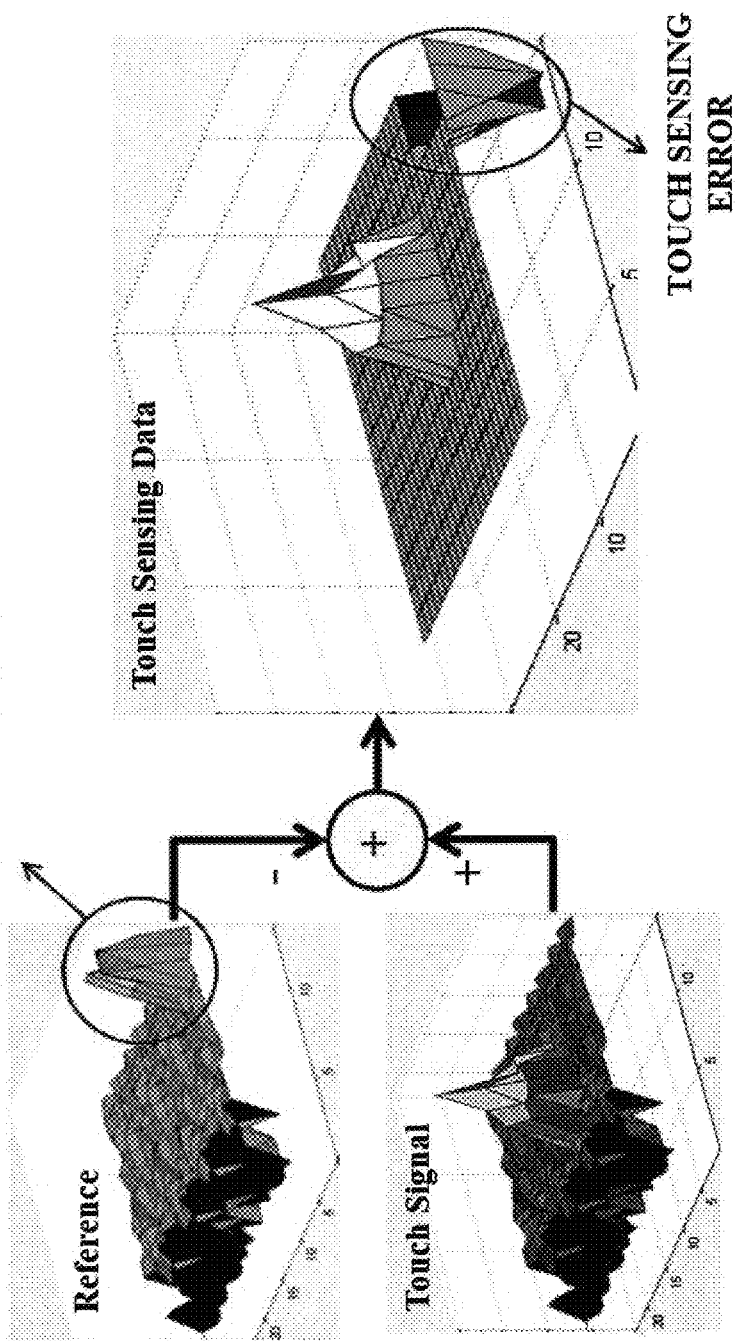
FIG. 1 is a diagram showing an acquisition result of touch data using a conventional touch sensing technology.
Figure 2:
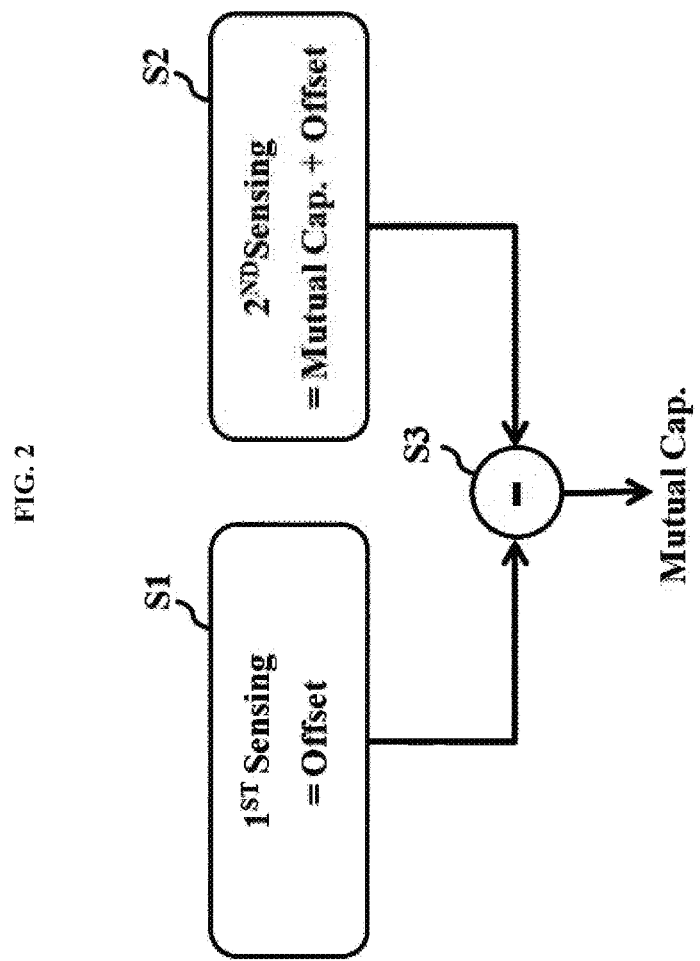
FIG. 2 is a schematic diagram for explaining a touch sensing method according to an embodiment of the present invention.

FIG. 2 is a schematic diagram for explaining a touch sensing method according to an embodiment of the present invention.

In the touch sensing method according to the present invention, a first sensing for sensing an offset component of each touch node and a second sensing for sensing a mutual capacitive component based on whether a touch is performed and the offset component are consecutively performed, and then, a differential operation is performed on a first sensing value from a second sensing value to acquire touch sensing data corresponding to a mutual capacitive component from which the offset component is removed.

In detail, in a first sensing step (S1), a driving pulse is not applied to a touch sensor, and a pure offset component excluding the mutual capacitive component is sensed and is output as a first sensing value.

Then, in a second sensing step (S2), the driving pulse is applied to the touch sensor, and the mutual capacitive component and the offset component are sensed and output as a second sensing value.

Then, in a third differential operation step (S3), touch sensing data corresponding to the mutual capacitive component from which the offset component is removed is acquired by performing the differential operation on the second sensing value sensed in the second sensing step (S2) and the first sensing value sensed in the first sensing step (S1) and is output.

Figure 3:
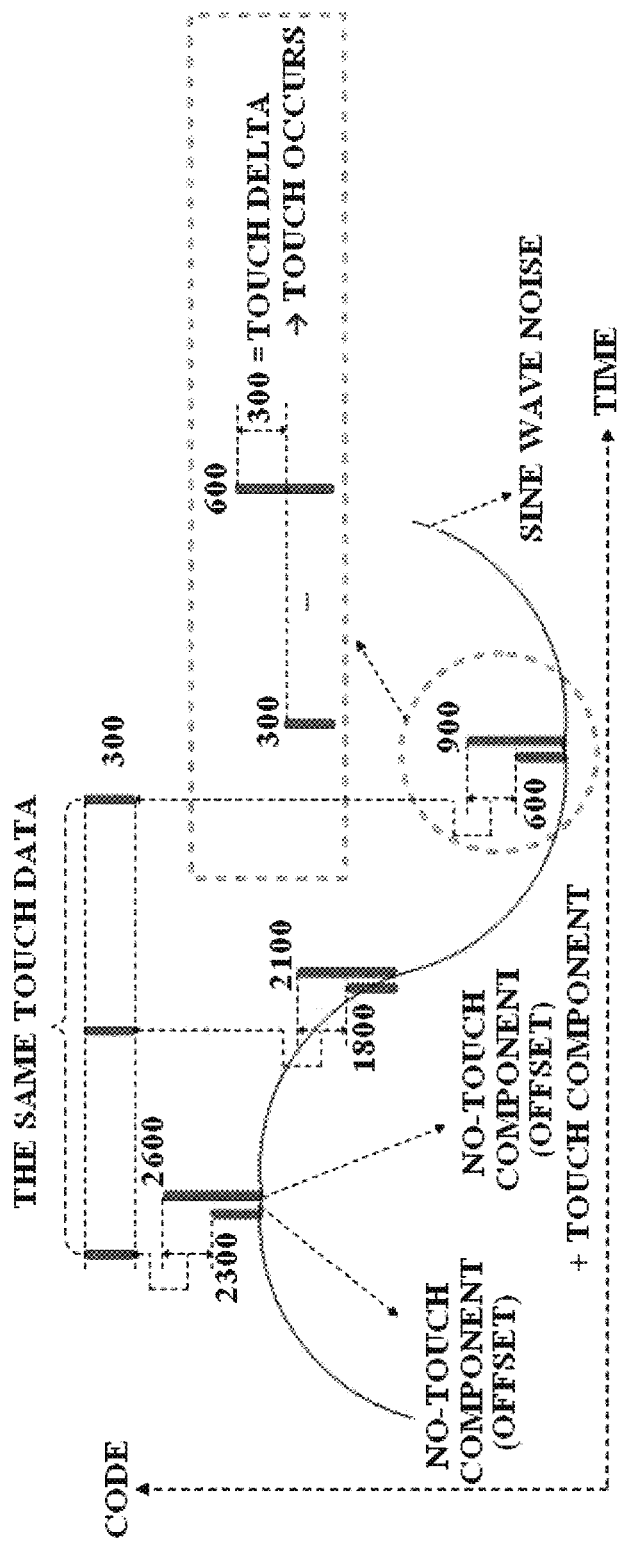
FIG. 3 is a diagram explaining a process of acquiring touch data using a touch sensing method according to an embodiment of the present invention.

FIG. 3 is a diagram explaining a process of acquiring touch data using a touch sensing method according to an embodiment of the present invention.

As seen from FIG. 3, although low frequency sine wave noise is applied to the touch sensor and an offset component of a no-touch state varies over time, the first sensing value that is an offset component obtained in the first sensing is removed via a differential operation of the second sensing value obtained in the second sensing following the first sensing, thereby acquiring constant touch data from which low frequency noise and the offset component of the no-touch state are removed.

Figure 4:
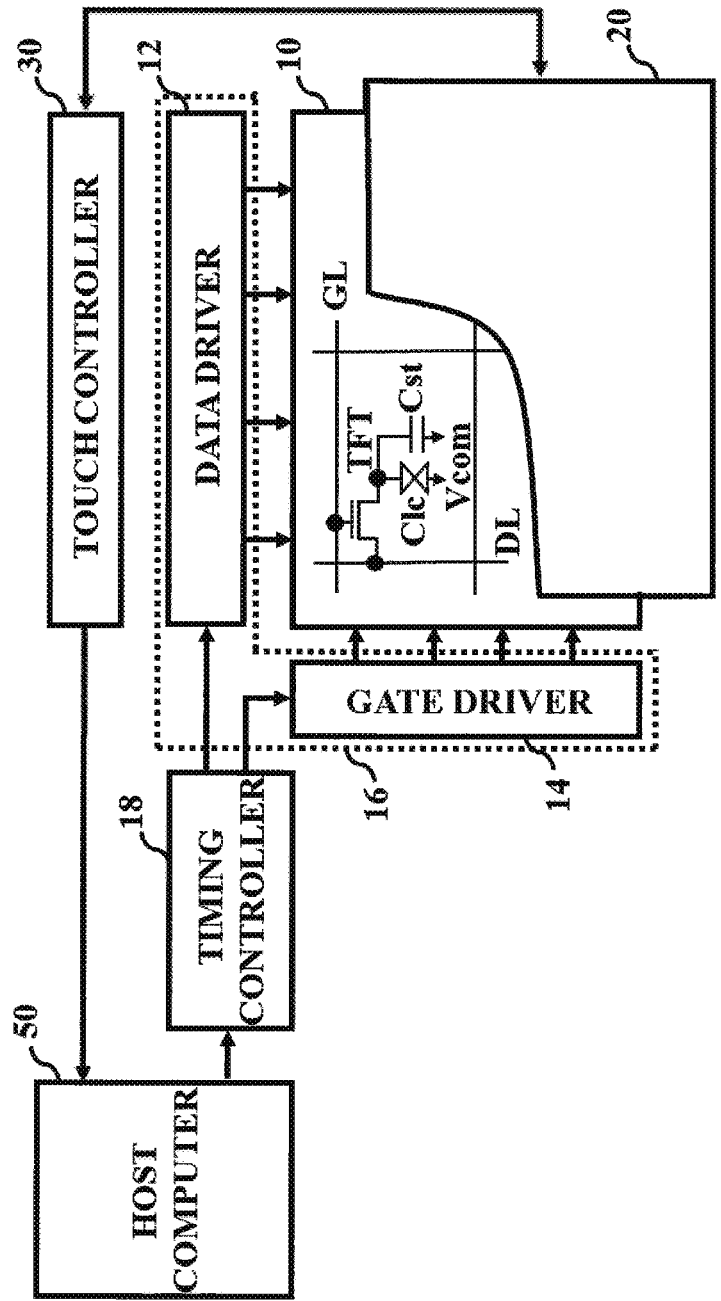
FIG. 4 is a block diagram of a structure of a display apparatus including a touch sensing apparatus according to an embodiment of the present invention.
Figure 5:
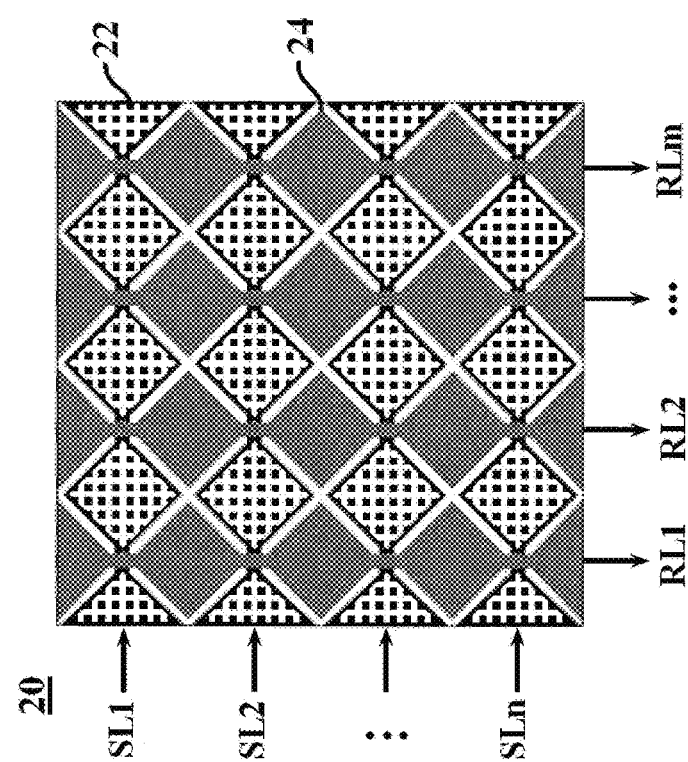
FIG. 5 is a diagram of an example of a structure of a capacitive touch sensor 20 shown in FIG. 4.

FIG. 4 is a block diagram of a structure of a display apparatus including a touch sensing apparatus according to an embodiment of the present invention, and FIG. 5 is a diagram of an example of a structure of a capacitive touch sensor 20 shown in FIG. 4.

The display apparatus including the touch sensing apparatus of FIG. 4 includes a display panel 10, a panel driver 16 including a data driver 12 and a gate driver 14, for driving the display panel 10, a timing controller 18 for controlling the panel driver 16, the touch sensor 20 disposed above the display panel 10, and a touch controller 30 for driving the touch sensor 20. The timing controller 18 and the touch controller 30 are connected to a host computer 50.

The timing controller 18 and the data driver 12 may be integrated in respective integrated circuits (ICs) or alternatively, the timing controller 18 may be internally installed in the data driver 12 to be integrated in one IC. Also, the touch controller 30 and the timing controller 18 may be integrated in respective ICs or alternatively, the touch controller 30 may be internally installed in the timing controller 18 to be integrated in one IC.

The display panel 10 includes a pixel matrix in which a plurality of pixels is arranged. The pixel matrix displays a graphical user interface (GUI) including a pointer or a cursor and other images. As the display panel 10, a flat display panel such as a liquid crystal display (LCD) panel (hereinafter, referred to as a 'liquid crystal panel'), a plasma display panel (PDP), or an organic light emitting diode (OLED) panel may be mainly used. Hereinafter, an example in which the display panel 10 is the liquid crystal panel will be described.

When the liquid crystal panel is used as the display panel 10, the display panel 10 includes a color filter substrate on which a color filter array is formed, a thin film transistor (TFT) substrate on which a TFT array is formed, a liquid crystal layer between the color filter substrate and the TFT substrate, and polarizing plates attached to external surfaces of the color filter substrate and TFT substrate. The display panel 10 displays an image through a pixel matrix on which a plurality of pixels is arranged. Each pixel implements desired color by combinations of red, green, and blue sub-pixels which adjust optical transmittance using variation in liquid crystal arrangement according to a data signal. Each sub-pixel includes a thin film transistor TFT connected to a gate line GL and a data line DL, and a liquid crystal capacitor Clc and a storage capacitor Cst that are connected in parallel to the thin film transistor TFT. The liquid crystal capacitor Clc is charged with a difference voltage between a voltage of the data signal applied to a pixel electrode through the thin film transistor TFT and a common voltage Vcom applied to a common electrode, and drives liquid crystal according to the charged voltage to adjust optical transmittance. The storage capacitor Cst stably maintains the voltage charged in the liquid crystal capacitor Clc. The liquid crystal layer is driven by a vertical electrical field, for example, in a twisted nematic (TN) mode or a vertical alignment (VA) mode or by a horizontal electrical field, for example, in an in-plane switching (IPS) mode or a fringe field switching (FFS) mode.

The data driver 12 supplies image data from the timing controller 18 to a plurality of data lines DLs of the display panel 10 in response to a data control signal from the timing controller 18. The data driver 12 converts digital data input from the timing controller 18 into a positive/negative analog data signal using a gamma voltage and supplies the data signal to the data line DL whenever the gate line GL is driven. The data driver 12 may include at least one data IC, may be mounted on a circuit film such as a tape carrier package (TCP), a chip on film (COF), a flexible print circuit (FPC), or the like, and may be attached to the display panel 10 using a tape automatic bonding (TAB) method or may be mounted on the display panel 10 using a chip on glass (COG) method.

The gate driver 14 sequentially drives a plurality of gate lines GLs formed on the TFT array of the display panel 10 in response to the gate control signal from the timing controller 18. The gate driver 14 supplies a scan pulse of a gate-on voltage every a corresponding scan period of each gate line GL and supplies a gate-off voltage for the remaining period when the other gate lines GLs are driven. The gate driver 14 may include at least one gate IC, may be mounted on a circuit film such as a TCP, a COF, a FPC, or the like, and may be attached to the display panel 10 using a TAB method or may be mounted on the display panel 10 using a COG method. In addition, the gate driver 14 may be internally installed in the display panel 10 using a gate in panel (GIP) method and may be formed on the TFT substrate together with a pixel array.

The timing controller 18 signal-processes image data input from the host computer 50 and supplies the image data to the data driver 12. For example, the timing controller 18 may correct and output data by over driving in which an overshoot value or an undershoot value is added according to a data difference between adjacent frames in order to increase response speed of liquid crystal. In addition, the timing controller 18 generates the data control signal for control of drive timing of the data driver 12 and the gate control signal for control of drive timing of the gate driver 14 using at least two of a plurality of synchronization signals input from the host computer 50, that is, a vertical synchronization signal, a horizontal synchronization signal, a data enable signal, and a dot clock. The timing controller 18 outputs the data control signal and the gate control signal to the data driver 12 and the gate driver 14, respectively. The data control signal includes a source start pulse and source sampling clock for control of latch of the data signal, a polarity control signal for control of polarity of the data signal, a source output enable signal for control of an output period of the data signal, etc. The gate control signal includes a gate start pulse and gate shift clock for control of scanning of a gate signal, a gate output enable signal for control of an output period of the gate signal, etc. The timing controller 18 may supply a synchronization signal (a vertical synchronization signal, a horizontal synchronization signal, etc.) to the touch controller 30 and may control drive timing of the touch controller 30 such that drive timing of the display panel 10 may be associated with drive timing of the touch sensor 20.

The touch sensor 20 may detect a user's touch such that the user may interact with the GUI displayed on the display panel 10. As the touch sensor 20, a capacitive type touch sensor indicating change in mutual capacitance, which occurs when a conductor such as a human body or a stylus touches the touch sensor to move a small amount of charges to a touch point, is mainly used. The touch sensor 20 may be attached to the display panel 10 or may be internally installed in the pixel matrix of the display panel 10.

For example, the capacitive type touch sensor 20 attached to the display panel 10 includes a plurality of scan lines SL1 to SLn configured by electrically connecting a plurality of first sensing electrodes 22 that are arranged in a row direction and a plurality of read out lines RL1 to RLm configured by electrically connecting a plurality of second sensing electrodes 24 that are arranged in a column direction. Each of the first and second sensing electrodes 22 and 24 may mainly have a diamond shape and may have various other shapes. The first and second sensing electrodes 22 and 24 are driven by the touch controller 30 to form initial capacitance based on a fringe field, form a capacitor with a conductive touch object that touches the touch sensor 20 to change initial capacitance, and output a read out signal indicating capacitance change to the touch controller 30.

The touch controller 30 sequentially supplies a driving pulse to the scan lines SL1 to SLn of the touch sensor 20, acquires touch data indicating whether touch is performed per touch node (per touch pixel, or per touch channel) using a read out signal output from the read out lines RL1 to RLm of the touch sensor 20, detects a touch point coordinate of a touch region based on the touch data, and supplies the touch point coordinate to the host computer 50.

In particular, the touch controller 30 acquires the first sensing value by sensing an offset component of each touch node using the read out signal output from the read out lines RL1 to RLm in a first sensing period before a driving pulse is supplied to each of the scan lines SL1 to SLn. Subsequently, the touch controller 30 acquires the second sensing value by sensing a mutual capacitive component and an offset component of each touch node using the read out signal output from the read out lines RL1 to RLm in a second sensing period in which a driving pulse is supplied to each of the scan lines SL1 to SLn. The touch controller 30 acquires the touch data corresponding to the mutual capacitive component from which an offset component is removed by differential operating the first sensing value from the second sensing value obtained in the second sensing. Thus, the touch data from which noise is removed may be correctly acquired, thereby increasing accuracy of touch sensing.

The host computer 50 supplies image data and a plurality of synchronization signals to the timing controller 18 and analyzes the touch point coordinate input from the touch controller 30 to perform a command corresponding to a user's touch operation.

Figure 6:
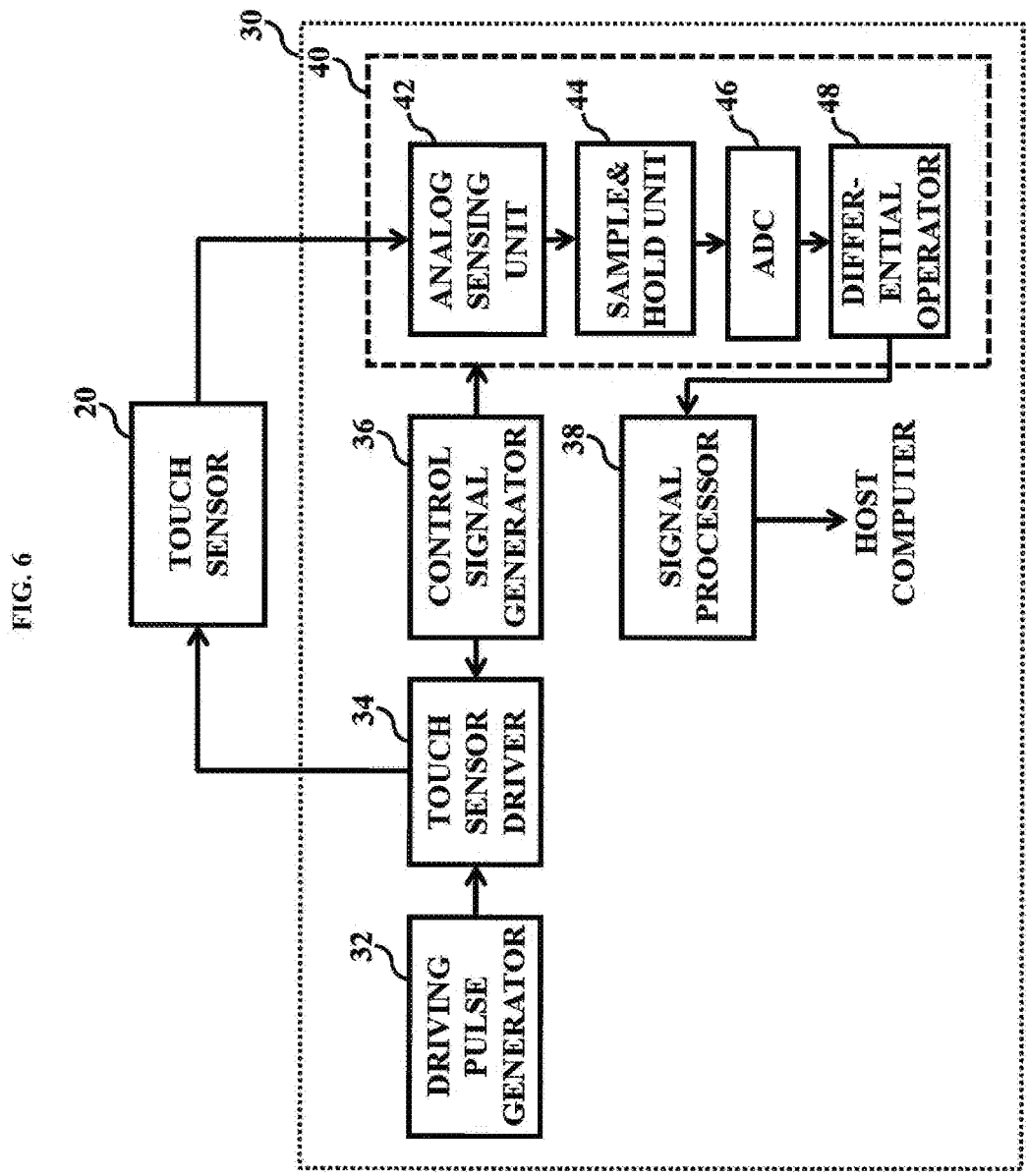
FIG. 6 is a circuit block diagram showing a structure of the touch sensing apparatus of FIG. 4.

FIG. 6 is a circuit block diagram showing a structure of the touch sensing apparatus of FIG. 4.

The touch sensing apparatus of FIG. 6 includes the touch controller 30 connected to the touch sensor 20. The touch controller 30 includes a driving pulse generator 32 and a touch sensor driver 34 in order to drive the touch sensor 20. In addition, the touch controller 30 includes a read out circuit 40 and a signal processor 38 in order to sense a touch from the touch sensor 20, and a control signal generator 36 for control of drive timing of the touch sensor driver 34 and the read out circuit 40.

The driving pulse generator 32 repeatedly generate a driving pulse having a square wave form and outputs the driving pulse to the touch sensor driver 34.

The touch sensor driver 34 sequentially supplies the driving pulse from the driving pulse generator 32 to the scan lines SL1 to SLn (see FIG. 2) of the touch sensor 20 in response to the control signal from the control signal generator 36. In this case, an allocation period of each of the scan lines SL1 to SLn includes the aforementioned first and second sensing periods, and thus, the touch sensor driver 34 supplies a driving pulse to each scan line such that a driving pulse between adjacent scan lines may have a time interval corresponding to the first sensing period.

The read out circuit 40 detects touch data per touch node using the read out signal output from the read out lines RL1 to RLm (see FIG. 2) every first sensing period in which a driving pulse is not supplied to the scan lines SL1 to SLn of the touch sensor 20 and every second sensing period in which the driving pulse is supplied.

To this end, the read out circuit 40 includes an analog sensing unit 42, a sample and hold unit 44, an analog-to-digital converter (ADC) 46, and a differential operator 48.

The analog sensing unit 42 mainly includes an integrator and integrates the read out signal from the touch sensor 20 to output an analog sensing signal. The analog sensing unit 42 integrates the read out signal from the touch sensor 20 to output a first analog sensing signal in the first sensing period, and then, integrates the read out signal from the touch sensor 20 to output a second analog sensing signal in the second sensing period.

The sample and hold unit 44 samples and holds the analog sensing signal from the analog sensing unit 42 to output the sampled and held analog sensing signal. The sample and hold unit 44 samples and holds the first analog sensing signal from the analog sensing unit 42 to output the sampled and held first analog sensing signal in the first sensing period, and then, samples and holds the second analog sensing signal from the analog sensing unit 42 to output the sampled and held second analog sensing signal in the second sensing period.

The ADC 46 converts the analog sensing signal output from the sample and hold unit 44 into digital data to output the digital data. The ADC 46 converts the first analog sensing signal from the sample and hold unit 44 into the first sensing data to output the first sensing data in the first sensing period, and then, converts the second analog sensing signal from the sample and hold unit 44 into second sensing data to output the second sensing data in the second sensing period.

The differential operator 48 performs a differential operation on the first and second sensing data supplied from the ADC 46 to acquire and output the touch data from which an offset component is removed. The differential operator 48 temporally stores the first sensing data supplied from the ADC 46 in a buffer in the first sensing period and then performs a differential operation on the second sensing data supplied from the ADC 46 and the buffered first sensing data in the second sensing period to acquire and output the touch data from which the offset component is removed.

The signal processor 38 determines whether a touch is performed per touch pixel using the sensing data from the read out circuit 40 to detect a touch region, detects a touch point coordinate of the detected touch region, and supplies the touch point coordinate to the host computer 50.

The control signal generator 36 generates a plurality of control signals for control of the drive timing of the touch sensor driver 34 and the read out circuit 40, and supplies the control signals to corresponding circuit blocks.

Figure 7:
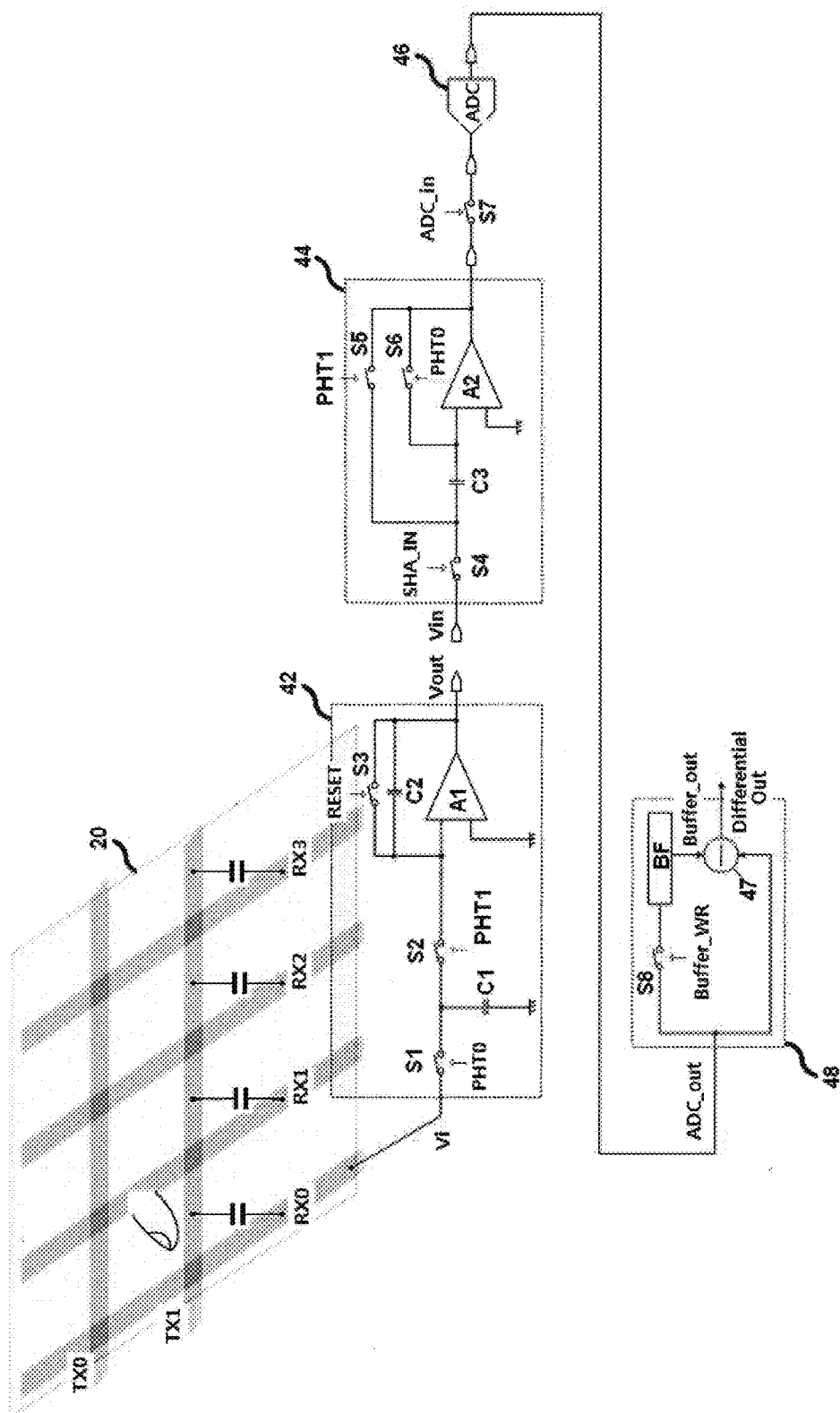
FIG. 7 is a circuit diagram showing a detailed structure of the read out circuit 40 shown in FIG. 6.
Figure 8:
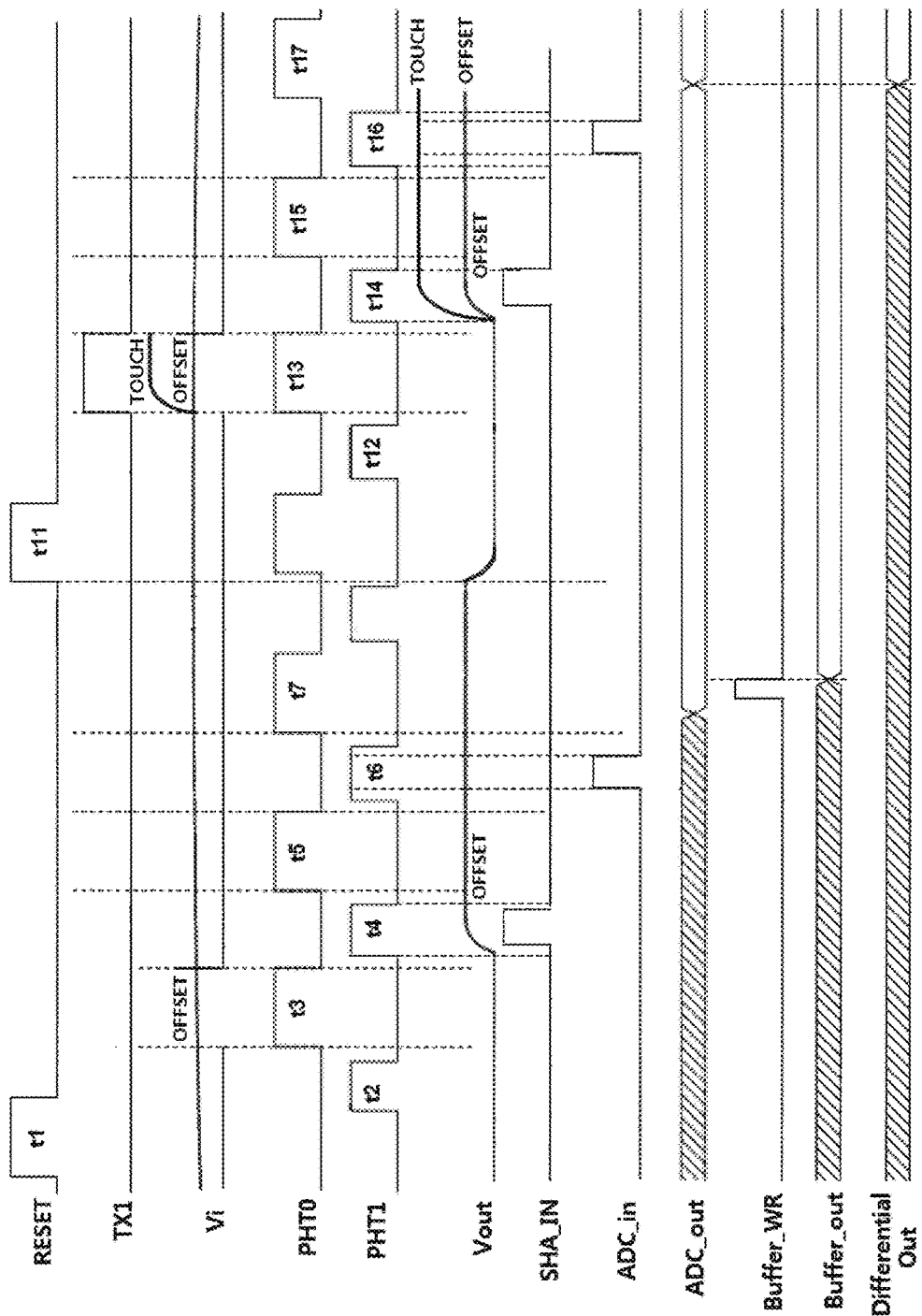
FIG. 8 is an input and output waveform diagram of a read out circuit shown in FIG. 7.

FIG. 7 is a diagram showing a detailed structure of the read out circuit 40 shown in FIG. 6, and in particular, shows a detailed circuit of one channel connected to a read output line RX0. FIG. 8 is a driving waveform diagram of a read output signal of FIG. 7 and shows a representative driving waveform in first and second sensing periods of a scan line TX1.

Referring to FIG. 7, the analog sensing unit 42 includes a first amplifier A1, first and second switches S1 and S2 that are connected in series to each other between the read output line RX0 and one terminal of the first amplifier A1, a first capacitor C1 between a ground and a node in the middle of the first and second switches S1 and S2, and a third switch S3 and a second capacitor C2 that are connected in parallel to each other between one input terminal and one output terminal of the first amplifier A1.

The sample and hold unit 44 includes a second amplifier A2, a fourth switch S4 and a third capacitor C3 that are connected in series to each other between an output terminal of the analog sensing unit 42 and one input terminal of the second amplifier A2, a fifth switch S5 connected between the fourth switch S4 and an output terminal of the second amplifier A2, and a sixth switch S6 connected between one input terminal and one output terminal of the second amplifier A2.

The ADC 46 further includes a seventh switch S7 connected to an input terminal thereof.

The differential operator 48 includes a buffer BF, an eighth switch S8 connected between an output terminal of the ADC 46 and the buffer BF, and a subtracter 47 connected between the output terminal of the ADC 46 and an output terminal of the buffer BF.

The analog sensing unit 42, the sample and hold unit 44, and the ADC 46 of the read out circuit 40 of FIG. 7 may repeat the same operation in the first and second sensing periods shown in FIG. 8 to sense the first and second sensing data, respectively. In addition, the differential operator 48 may acquire touch data from which an offset component is removed via a differential operation of the first and second sensing data.

Referring to FIGS. 7 and 8, input and output terminals of an amplifier A1 of the analog sensing unit 42 are shortened in response to a reset signal RESET in a period t1 of the first sensing period.

Then, after a period t2 elapses, a first read output signal is sensed from a corresponding read output line RX0 and is stored in a capacitor C1 when a driving pulse is not applied to a corresponding scan line TX1 of the touch sensor 20 by turning on the first switch S1 in response to a first control signal PHTO in a period t3.

Then, the first read output signal that is stored in the first capacitor C1 is integrated via the first amplifier A1, and a voltage Vout proportional to a capacitance ratio C1/C2 of the first and second capacitors C1 and C2 are output as a first sensing signal by turning on the second switch S2 in response to a second control signal PHT1 that does not overlap with the first control signal PHTO in a period t4. In this case, the first sensing signal output from the analog sensing unit 42 is sampled and is held in the third capacitor C3 by turning on a fourth switch S4 of the sample and hold unit 44 in response to a third control signal SHA_IN that overlaps with the second control signal PHT1 and turning on a fifth switch S5 in response to the second control signal PHT1.

Then, the second amplifier A2 outputs the first sensing signal held in the third capacitor C3 by turning on a sixth switch S6 in response to the first control signal PHTO in a period t5.

Then, the first sensing signal from the sample and hold unit 44 is supplied to the ADC 46 by turning on the seventh switch S7 in response to a fourth control signal ADC_in that overlaps with the second control signal PHT1 in a period t6.

Thus, the ADC 46 converts the first sensing signal into first digital sensing data to output the first digital sensing data in a period t7. In this case, the first digital sensing data supplied from the ADC 46 is stored in the buffer BF by turning on the eighth switch S8 of the differential operator 48 in response to a fifth control signal Buffer_WR that overlaps with the first control signal PHTO in the period t7.

Then, input and output terminals of the amplifier A1 of the analog sensing unit 42 are shortened in response to the reset signal RESET in a period t11 of the second sensing period.

Then, after a period t12 elapses, a second read out signal is sensed and is stored in the capacitor C1 when a driving pulse is applied to a corresponding scan line TX1 of the touch sensor 20 by turning on the first switch S1 in response to the first control signal PHTO in a period t13.

Then, the second read out signal that is stored in the first capacitor C1 is integrated via the first amplifier A1 and a voltage Vout proportional to the capacitance ratio C1/C2 of the first and second capacitors C1 and C2 are output as a second sensing signal by turning on the second switch S2 in response to the second control signal PHT1 that does not overlap with the first control signal PHTO in a period t14. In this case, the second sensing signal output from the analog sensing unit 42 is sampled and is held in the third capacitor C3 by turning on the fourth switch S4 of the sample and hold unit 44 in response to the third control signal SHA_IN that overlaps with the second control signal PHT1 and turning on a fifth switch S5 in response to the second control signal PHT1.

Then, the second amplifier A2 outputs the second sensing signal held in the third capacitor C3 by turning on the sixth switch S6 in response to the first control signal PHTO in a period t15.

Then, the second sensing signal from the sample and hold unit 44 is supplied to the ADC 46 by turning on the seventh switch S7 in response to the fourth control signal ADC_in that overlaps with the second control signal PHT1 in a period t16.

Thus, the ADC 46 converts the second sensing signal into second digital sensing data to output the second digital sensing data in a period t17.

Thus, the subtracter 47 of the differential operator 48 performs subtraction on the second sensing data supplied from the ADC 46 and the first sensing data supplied from the buffer BF in the period t17 to output the subtraction result as touch data. Thus, the differential operator 48 may output accurate sensing data by removing an offset component corresponding to the first sensing data from the second sensing data.

Figure 9:
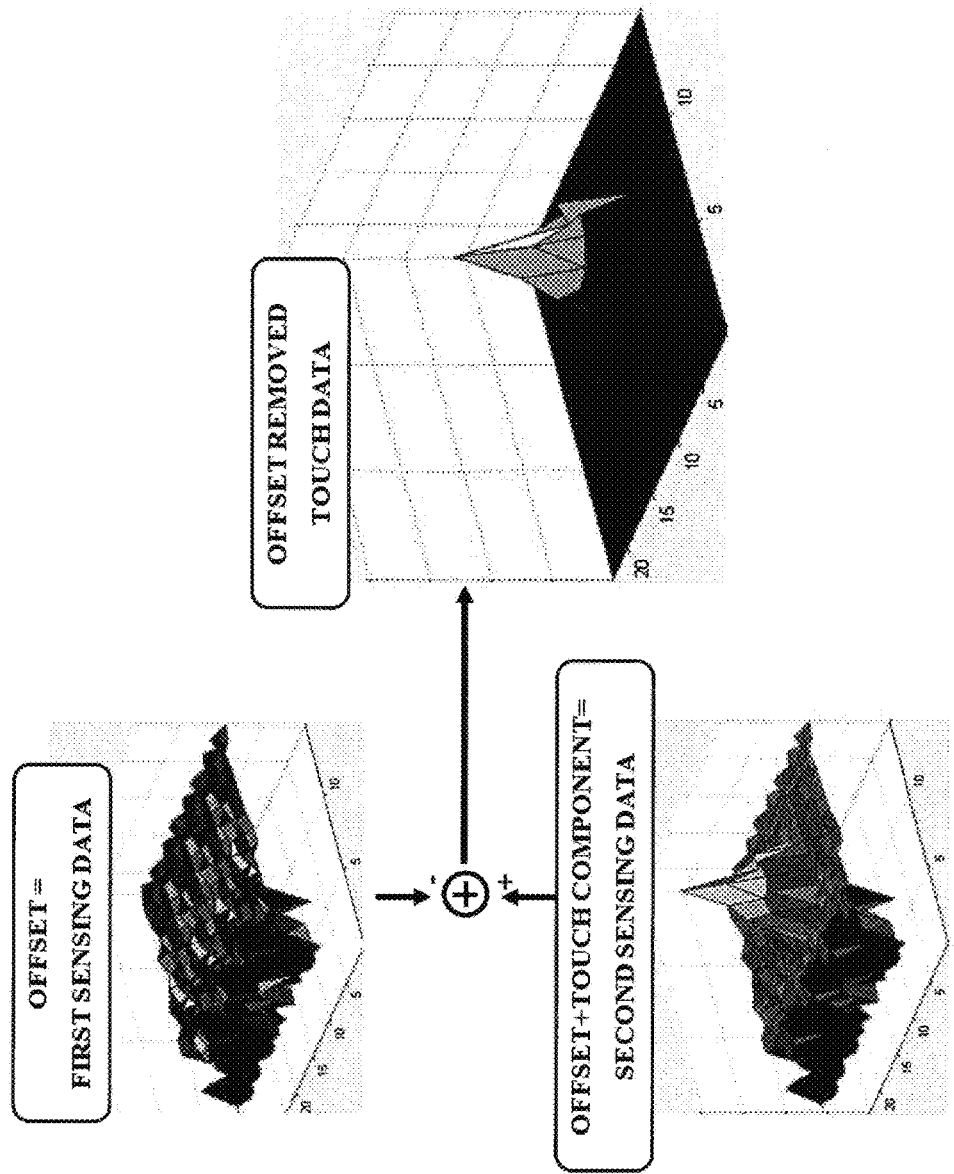
FIG. 9 is a diagram showing an acquisition result of touch data using a touch sensing method according to an embodiment of the present invention.

FIG. 9 is a diagram showing an acquisition result of touch data using a touch sensing method according to an embodiment of the present invention.

As seen from FIG. 9, first sensing data including an offset component is acquired when a driving pulse is not applied to a touch sensor in a first sensing period, second sensing data including an offset component and a touch (mutual capacitance) component is acquired when a driving pulse is applied to the touch sensor in a second sensing period, and then, differential operation is performed on the first and second sensing data to remove the offset component from the second sensing data, thereby acquiring touch data including only the touch component.

Thus, a touch sensing apparatus and method according to the present invention may prevent touch sensing error due to noise and may correctly sense a touch by repeating first sensing for sensing an offset component, as a first sensing value, which does not use a driving pulse and second sensing for sensing an offset component and a mutual capacitive component, as a second sensing value, using a driving pulse, and performing a differential operation on the first sensing value and the second value to acquire touch data from which the offset component is removed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch sensing method, the method comprising:
acquiring, via a touch controller, a first sensing value representing only noise by sensing an offset component of each touch node using a first read out signal from a corresponding read out line of a touch sensor before a voltage of a driving pulse from the touch controller is supplied to a corresponding scan line of the touch sensor, in a first sensing period;
acquiring, via the touch controller, a second sensing value by sensing the offset component of each of the touch node and a capacitance change based on whether a touch is performed, using a second read out signal from the corresponding read out line of the touch sensor, in a second sensing period in which the driving pulse from the touch controller is supplied to the touch sensor; and
acquiring, via the touch controller, a touch data corresponding to the capacitance change from which the offset component is removed via a differential operation of the second sensing value and the first sensing value,
wherein:
a readout circuit of one channel connected with the corresponding read out line includes an analog sensing unit, a sample and hold unit, an analog-to-digital converter (ADC), and a differential operator,
during the first sensing period, the analog sensing unit acquires the first sensing value from the corresponding read out line and supplies the first sensing value to the sample and hold unit, the sample and hold unit samples and holds the first sensing value and supplies the first sensing value to the ADC, the ADC converts the first sensing value into the first digital sensing data, and the differential operator stores the first digital sensing data supplied from the ADC, and
during the second sensing period, the analog sensing unit acquires the second sensing value from the corresponding read out line, and supplies the second sensing value to the sample and hold unit, the sample and hold unit samples and holds the second sensing value and supplies the second sensing value to the ADC, the ADC converts the second sensing value into the second digital sensing data, and the differential operator performs a subtraction operation of the second digital sensing data supplied from the ADC and the first digital sensing data to remove noise sensed on the corresponding read out line before the driving pulse is supplied and acquire the touch data corresponding to the capacitance change, and
wherein the first and second sensing periods are immediately adjacent periods.

2. The method of claim 1, further comprising:
integrating the first read out signal to output a first analog sensing signal, holding and sampling the first analog sensing signal to output the sampled and held first analog sensing signal, converting the first analog sensing signal into the first digital sensing data to output the first digital sensing data, and inputting the first digital sensing data and storing the first digital sensing data in the buffer, in the first sensing period; and
integrating the second read out signal to output a second analog sensing signal, holding and sampling the second analog sensing signal to output the sampled and held second analog sensing signal, converting the second analog sensing signal into the second digital sensing data to output the second digital sensing data, and performing subtraction on the second digital sensing data and the first digital sensing data from the buffer to acquire the touch data, in the second sensing period.

3. A touch sensing apparatus comprising:
a touch sensor for outputting a read out signal indicating capacitance change based on a presence of touch; and
a touch controller for:
acquiring a first sensing value representing only noise by sensing an offset component of each touch node using a first read out signal from a corresponding read out line of the touch sensor before a voltage of a driving pulse from the touch controller is supplied to a corresponding scan line of the touch sensor, in a first sensing period,
acquiring a second sensing value by sensing the offset component of each of the touch node and a capacitance change based on whether a touch is performed, using a second read out signal from the corresponding read out line of the touch sensor, in a second sensing period in which the driving pulse from the touch controller is supplied to the touch sensor, and
acquiring a touch data corresponding to the capacitance change from which the offset component is removed via a differential operation of the second sensing value and the first sensing value,
wherein:
a readout circuit of one channel connected with the corresponding read out line includes an analog sensing unit, a sample and hold unit, an analog-to-digital converter (ADC), and a differential operator,
during the first sensing period, the analog sensing unit acquires the first sensing value from the corresponding read out line and supplies the first sensing value to the sample and hold unit, the sample and hold unit samples and holds the first sensing value and supplies the first sensing value to the ADC, the ADC converts the first sensing value into the first digital sensing data, and the differential operator stores the first digital sensing data supplied from the ADC, and
during the second sensing period, the analog sensing unit acquires the second sensing value from the corresponding read out line, and supplies the second sensing value to the sample and hold unit, the sample and hold unit samples and holds the second sensing value and supplies the second sensing value to the ADC, the ADC converts the second sensing value into the second digital sensing data, and the differential operator performs a subtraction operation of the second digital sensing data supplied from the ADC and the first digital sensing data to remove noise sensed on the corresponding read out line before the driving pulse is supplied and acquire the touch data corresponding to the capacitance change, wherein the first and second sensing periods are immediately adjacent periods.

4. The touch sensing apparatus of claim 3, wherein the touch controller includes:
a control signal generator for generating and outputting a plurality of control signals;
a driving pulse generator for generating and outputting the driving pulse;
a touch sensor driver for not supplying the driving pulse from the driving pulse generator to a corresponding scan line of the touch sensor in the first sensing period and supplying the driving pulse to the corresponding scan line in the second sensing period in response to a control signal from the control signal generator; and
the read out circuit for sensing the first sensing value using the first read out signal from the corresponding read out line of the touch sensor in the first sensing period and sensing the second sensing value using the second read out signal from the corresponding read out line in the second sensing period in response to the control signal from the control signal generator, and then, acquiring and outputting the touch data via the differential operation of the first and second sensing values.

5. The touch sensing apparatus of claim 4, wherein the read out circuit includes:
the analog sensing unit for integrating the first read out signal to output a first analog sensing signal in the first sensing period, and integrating the second read out signal to output a second analog sensing signal in the second sensing period;
the sample and hold unit for holding and sampling the first analog sensing signal to output the sampled and held first analog sensing signal in the first sensing period, and holding and sampling the second analog sensing signal to output the sampled and held second analog sensing signal in the second sensing period;
the ADC for converting the first analog sensing signal from the sample and hold unit into the first digital sensing data to output the first digital sensing data in the first sensing period, and converting the second analog sensing signal from the sample and hold unit into the second digital sensing data to output the second digital sensing data in the second sensing period; and
the differential operator for inputting the first digital sensing data and storing the first digital sensing data in the buffer in the first sensing period, and performing subtraction on the second digital sensing data and the first digital sensing data from the buffer in the second sensing period to acquire the touch data.

6. The touch sensing apparatus of claim 3, wherein:
the touch sensor includes scan lines and read out lines intersecting each other,
a period allocated for each of the scan lines includes consecutive first and second sensing periods, and
the touch controller senses first sensing values by read out channel using first read out signals respectively outputting from the read out lines in the first sensing period, senses second sensing values by read out channel using second read out signals respectively outputting from the read out lines in the second sensing period, and acquiring touch data per touch node via the differential operation of each of the second sensing values and each of the first sensing values.

7. The touch sensing method of claim 1, wherein a process sensing the first sensing value from the first read out signal is the same as a process sensing the second sensing value from the second read out signal.

8. The touch sensing apparatus of claim 3, wherein in the touch controller, a process sensing the first sensing value from the first read out signal is the same as a process sensing the second sensing value from the second read out signal.

9. The touch sensing apparatus of claim 5, wherein the analog sensing unit comprises:
a first amplifier connected with the corresponding read out line,
first and second switches that are connected in series to each other between the corresponding read output line and an input terminal of the first amplifier,
a first capacitor between a ground and a node between the first and second switches, and
a third switch and a second capacitor that are connected in parallel to each other between the input terminal and an output terminal of the first amplifier.

10. The touch sensing apparatus of claim 9, further comprising a sample and hold unit including:
a second amplifier connected with an output terminal of the analog sensing unit,
a fourth switch and a third capacitor that are connected in series to each other between the output terminal of the analog sensing unit and an input terminal of the second amplifier,
a fifth switch connected between the fourth switch and an output terminal of the second amplifier, and
a sixth switch connected between the input terminal and the output terminal of the second amplifier.

11. The touch sensing apparatus of claim 10, further comprising:
an analog-to-digital converter, wherein the analog-to-digital converter further comprises a seventh switch connected to an input terminal the digital-to-analog converter and an output terminal of the sample and hold unit, and
a differential operator comprising:
a buffer connected with an output terminal of the analog-to-digital converter,
an eighth switch connected between the output terminal of the analog-to-digital converter and the buffer, and
a subtracter connected between the output terminal of the analog-to-digital converter and an output terminal of the buffer.

12. The touch sensing apparatus of claim 11, wherein the analog sensing unit is configured to:
short the input and output terminals of the first amplifier via the third switch responding to a reset signal to reset the first amplifier,
store a corresponding read out signal from the corresponding read out line in first capacitor via the first switch responding to a first control signal, and
integrate the stored signal via the second switch responding to a second control signal and the first amplifier to output a corresponding sensing signal proportional to a capacitance ratio of the first and second capacitor.

13. The touch sensing apparatus of claim 12, wherein the sample and hold unit is configured to:
hold the corresponding sensing signal in the third capacitor via the four switch responding to a third control signal and the fifth switch responding to the second control signal, and
output the corresponding sensing signal via the second amplifier and the sixth switch responding to the first control signal.

14. The touch sensing apparatus of claim 13, wherein:
the analog-to-digital converter is configured to convert the sensing signal, received via the seventh switch responding to a fourth control signal from the sample and hole unit, to a corresponding sensing data as the first or second sensing value, and the differential operator is configured to:

store the first sensing value in the buffer via the eighth switch responding to a fifth control signal in part of the first sensing period, and perform subtraction on the second sensing data from the analog-to-digital converter and the first sensing data from the buffer via the subtracter in part of the second sensing period to output the subtraction result as the touch data.

* * * * *